(12) United States Patent
Shimono et al.

(10) Patent No.: US 11,498,289 B2
(45) Date of Patent: Nov. 15, 2022

(54) COMPOSITE MATERIAL MOLDING METHOD AND COMPOSITE MATERIAL MOLDING DEVICE

(71) Applicant: MITSUBISHI HEAVY INDUSTRIES, LTD., Tokyo (JP)

(72) Inventors: Kodai Shimono, Tokyo (JP); Hiroshi Tokutomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 53 days.

(21) Appl. No.: 16/607,294

(22) PCT Filed: Mar. 8, 2018

(86) PCT No.: PCT/JP2018/009033
§ 371 (c)(1),
(2) Date: Oct. 22, 2019

(87) PCT Pub. No.: WO2018/198548
PCT Pub. Date: Nov. 1, 2018

(65) Prior Publication Data
US 2020/0047432 A1 Feb. 13, 2020

(30) Foreign Application Priority Data

Apr. 28, 2017 (JP) .............................. JP2017-090328

(51) Int. Cl.
*B29C 70/44* (2006.01)
*B29C 70/34* (2006.01)
*B29C 43/12* (2006.01)

(52) U.S. Cl.
CPC ............ *B29C 70/443* (2013.01); *B29C 43/12* (2013.01); *B29C 70/345* (2013.01)

(58) Field of Classification Search
None
See application file for complete search history.

(56) References Cited

U.S. PATENT DOCUMENTS

2008/0136060 A1* 6/2008 Shpik .................... B29C 70/443
264/319
2012/0119422 A1* 5/2012 Lockett ............... B29C 37/0085
264/554
(Continued)

FOREIGN PATENT DOCUMENTS

| JP | 2012-228800 | 11/2012 |
| JP | 2013-154494 | 8/2013 |
| JP | 2016-151007 | 8/2016 |

OTHER PUBLICATIONS

Written Opinion of the International Searching Authority dated May 15, 2018 in International (PCT) Application No. PCT/JP2018/009033, with English-language translation.
(Continued)

*Primary Examiner* — Barbara J Musser
(74) *Attorney, Agent, or Firm* — Wenderoth, Lind & Ponack, L.L.P.

(57) ABSTRACT

A method for molding a composite material obtained by laying up a fiber-reinforced base material includes: disposing a lay-up in which the fiber-reinforced base material is laid up, on a molding surface of a molding jig; covering the lay-up with a film to hermetically seal the lay-up; supplying resin toward the lay-up from a resin supplying unit; sucking atmosphere in the film from a degassing waterproof unit while blocking the resin in the film from passing to impregnate the lay-up with the resin; and discharging the resin in the film from a resin discharging unit after the lay-up is impregnated with the resin. The resin supplying unit is provided on the film side. The degassing waterproof unit is provided on the molding surface side and along one direction in a plane perpendicular to a laying-up direction of the lay-up. The resin discharging unit is provided at the film side.

9 Claims, 5 Drawing Sheets

(56) References Cited

U.S. PATENT DOCUMENTS

| | | | |
|---|---|---|---|
| 2013/0069286 A1* | 3/2013 | Heim | B29C 70/48 |
| | | | 264/571 |
| 2013/0175740 A1* | 7/2013 | Shinoda | B29C 43/20 |
| | | | 264/571 |
| 2014/0327190 A1* | 11/2014 | Ballow | B29C 33/68 |
| | | | 264/571 |
| 2016/0243770 A1 | 8/2016 | Akiyama et al. | |

OTHER PUBLICATIONS

International Search Repot dated May 15, 2018 in International (PCT) Application No. PCT/JP2018/009033.

* cited by examiner

COMPOSITE MATERIAL MOLDING METHOD AND COMPOSITE MATERIAL MOLDING DEVICE

FIELD

The present invention relates to a molding method for a composite material and a molding device for a composite material.

BACKGROUND

Conventionally, as a molding method for a composite material, what is called a Vacuum assisted Resin Transfer Molding (VaRTM) process has been known (for example, see Patent Literature 1). In the VaRTM process, a composite material is molded by first hermetically covering a fiber-reinforced base material that is laid up on a shaping mold by a vacuum film, vacuum sucking the fiber-reinforced base material, and then impregnating and curing the fiber-reinforced base material by injecting resin. In this molding method, a degassing unit is disposed on the upper surface of a body to be molded serving as the fiber-reinforced base material along the center line. Moreover, in the molding method, a plurality of resin supplying units are disposed on each body to be molded provided at both sides of the degassing unit. Furthermore, in this molding method, the body to be molded is impregnated with resin, by supplying resin from the resin supplying units at both sides, while degassing the body to be molded by the degassing unit. In this example, the degassing unit is a degassing bag that includes fabric with a membrane that has semi-permeability (semi-permeable membrane) and a ventilation means. The degassing unit allows gas such as air to pass through, but does not allow resin to pass through.

CITATION LIST

Patent Literature

Patent Literature 1: Japanese Patent Application Laid-open No. 2012-228800

SUMMARY

Technical Problem

In the body to be molded obtained by laying up the fiber-reinforced base material, the impregnation rate of resin is sometimes slower in the plate thickness direction (laying-up direction) of the body to be molded, compared to that in the in-plane direction perpendicular to the plate thickness direction. In this case, in the molding method in Patent Literature 1, because the degassing unit is provided at the upper surface side (film side) of the body to be molded, the resin supplied from both sides flows toward the degassing unit. Consequently, the degassing unit may be covered by resin. When the degassing unit is covered by resin, air suction becomes difficult. Thus, the degasification at the shaping mold side that is a side opposite to the degassing unit in the body to be molded becomes insufficient, and a non-impregnated area of resin may be formed.

Moreover, in the molding method in Patent Literature 1, resin cannot be discharged from the degassing unit. Consequently, when resin is supplied to the body to be molded, the resin is accumulated in the body to be molded. In this process, when a predetermined plate thickness or fiber content is required for the composite material, the injection amount of resin needs to be adjusted by discharging resin. However, in the molding method in Patent Literature 1, it is difficult to adjust the injection amount of resin.

Thus, in a general molding method for a composite material, the injection amount of resin is adjusted, by first injecting resin into the body to be molded, and then degassing the body to be molded while discharging the resin. In other words, in this molding method, the line for degassing and the line for discharging resin are the same line. However, in this molding method, when the plate thickness of the composite material is changed in a predetermined in-plane direction, due to a difference in the impregnation rate of resin between the plate thickness direction and the in-plane direction, the resin moves faster toward a portion in which the plate thickness is thick from a portion in which the plate thickness is thin. Hence, in the portion in which the plate thickness is thick, a non-impregnated area of resin may be formed.

Consequently, an object of the present invention is to provide a molding method for a composite material and a molding device for a composite material capable of molding a composite material in a suitable manner, by preventing a non-impregnated area from being formed, even when the plate thickness of the composite material is changed in one direction in the plane of a composite material.

Solution to Problem

A molding method for a composite material according to the present invention is a molding method for a composite material to mold the composite material obtained by laying up a fiber-reinforced base material. The molding method includes disposing a lay-up in which the fiber-reinforced base material is laid up, on a molding surface of a molding jig for molding the composite material; covering the lay-up with a film to hermetically seal the lay-up; supplying resin toward the lay-up from a resin supplying unit provided at a side of the film of the lay-up; sucking atmosphere in the film from a degassing waterproof unit while blocking the resin in the film from passing to impregnate the lay-up with the resin, the degassing waterproof unit being provided at a side of the molding surface of the lay-up and provided along one direction in a plane perpendicular to a laying-up direction of the lay-up; and discharging the resin in the film from a resin discharging unit provided at the side of the film of the lay-up after the lay-up is impregnated with the resin.

Furthermore, a molding device for a composite material according to the present invention is a molding device for a composite material to mold the composite material obtained by laying up a fiber-reinforced base material. The molding device includes a molding jig on which a lay-up in which the fiber-reinforced base material is laid up is disposed, the molding jig having a molding surface for molding the composite material; a film for covering the lay-up to hermetically seal the lay-up; a resin supplying unit provided at a side of the film of the lay-up to supply resin; a degassing waterproof unit provided at a side of the molding surface of the lay-up and provided along one direction in a plane perpendicular to a laying-up direction of the lay-up to suck atmosphere in the film while blocking the resin in the film from passing; and a resin discharging unit provided at the side of the film of the lay-up to discharge the resin in the film.

Furthermore, the plate thickness of the lay-up in the laying-up direction is changed along the one direction in the plane perpendicular to the laying-up direction.

With this configuration, it is possible to supply resin from the film side of the lay-up, and suck the atmosphere in the film from the molding surface side of the lay-up. In this process, the atmosphere in the film is sucked from the film side toward the molding surface side. Consequently, with this suction, the resin is also impregnated in a suitable manner in the laying-up direction toward which the impregnation rate is slow. Moreover, the degassing waterproof unit is provided along one direction of the lay-up. Thus, in the composite material in which the plate thickness is changed along one direction, the suction of atmosphere can be continued at the other part of the degassing waterproof unit corresponding to the thick part in which the thickness of the lay-up is thick, even if the impregnation of the thin part in which the thickness of lay-up is thin is finished, and the suction is finished after the resin has reached a part of the degassing waterproof unit corresponding to the thin part. Consequently, the suction of atmosphere can be continued until the resin has reached the entire area of the degassing waterproof unit. Thus, it is possible to perform degasification at the molding surface side of the thin part and the thick part in a suitable manner. As a result, in the lay-up in which the plate thickness is changed along one direction, it is possible to prevent a non-impregnated area of resin from being formed, and mold a composite material by impregnating the lay-up with resin in a suitable manner. Moreover, by discharging the resin in the film, it is possible to adjust the injection amount of resin so that the plate thickness or the fiber content required for the composite material can be obtained.

Furthermore, it is preferable that the resin supplying unit is a resin diffusion and supplying unit that diffuses the resin in the one direction of the lay-up to supply the resin.

With this configuration, it is possible to diffuse and supply resin in one direction of the lay-up. Thus, it is possible to supply resin along the one direction toward which the plate thickness is changed. Consequently, by diffusing the resin from the film side of the lay-up, it is possible to prevent a non-impregnated area from being formed due to a change in the plate thickness.

Furthermore, it is preferable that the degassing waterproof unit includes a breathable waterproof membrane that allows the atmosphere in the film to pass through and that blocks the resin in the film from passing through, a vacuum suction medium through which the atmosphere that has passed through the breathable waterproof membrane flows, the vacuum suction medium being provided at a downstream side of a flowing direction of the atmosphere, and a vacuum suction line connected to the vacuum suction medium.

With this configuration, it is possible to suck the atmosphere in the film from the vacuum suction line via the vacuum suction medium and the breathable waterproof membrane.

Furthermore, it is preferable that the degassing waterproof unit further includes a vacuum gauge provided on one of the vacuum suction medium and the vacuum suction line to measure a degree of vacuum.

With this configuration, the breathable waterproof membrane can prevent the resin from flowing in. Consequently, it is possible to measure the degree of vacuum in the film by the vacuum gauge.

Furthermore, it is preferable that the resin discharging unit serves as the resin supplying unit.

With this configuration, the resin discharging unit and the resin supplying unit can serve as one unit. Consequently, it is possible to simplify the device structure and prevent an increase in the device cost.

Furthermore, it is preferable that the degassing waterproof unit is provided on an unused area that is an area where the composite material after being molded is not used as a product.

With this configuration, the degassing waterproof unit is provided at the molding surface side of the lay-up. By providing the degassing waterproof unit on the unused area, it is possible to prevent the molding surface of a product from being defectively formed. For example, the unused area is an area to be cut during machining and the like.

Furthermore, it is preferable that the resin supplying unit is provided at one side in a perpendicular direction, where the perpendicular direction is a direction perpendicular to the one direction in the plane of the lay-up, and the degassing waterproof unit is provided at another side in the perpendicular direction.

With this configuration, it is possible to suck the atmosphere in the film from the other side in the perpendicular direction, while supplying resin from one side in the perpendicular direction. Consequently, it is possible to impregnate the lay-up with resin in a suitable manner.

Furthermore, it is preferable that the resin supplying unit is provided at a center in a perpendicular direction, where the perpendicular direction is a direction perpendicular to the one direction, in the plane of the lay-up, and the degassing waterproof unit is provided at both sides in the perpendicular direction.

With this configuration, it is possible to suck the atmosphere in the film from both sides in the perpendicular direction, while supplying resin from the center in the perpendicular direction. Consequently, it is possible to impregnate the lay-up with resin in a suitable manner.

DESCRIPTION OF EMBODIMENTS

Hereinafter, embodiments according to the present invention will be described in detail with reference to the accompanying drawings. However, the present invention is not limited to these embodiments. Moreover, components in the following embodiments include components that can be easily replaced by a person skilled in the art, or components substantially the same as those components. Furthermore, the components described below can be combined with one another as appropriate. Still furthermore, when there are a plurality of embodiments, the embodiments may be combined with one another.

First Embodiment

For example, a molding device and a molding method for a composite material 1 according to a first embodiment is a device for molding a structure that configures an airframe of an aircraft and the like. The structure includes a wing body such as a main wing, a horizontal wing, or a tail wing, an airframe, and the like. In the first embodiment, the structure is not particularly limited, and is simply referred to as the composite material 1.

Figure 1:
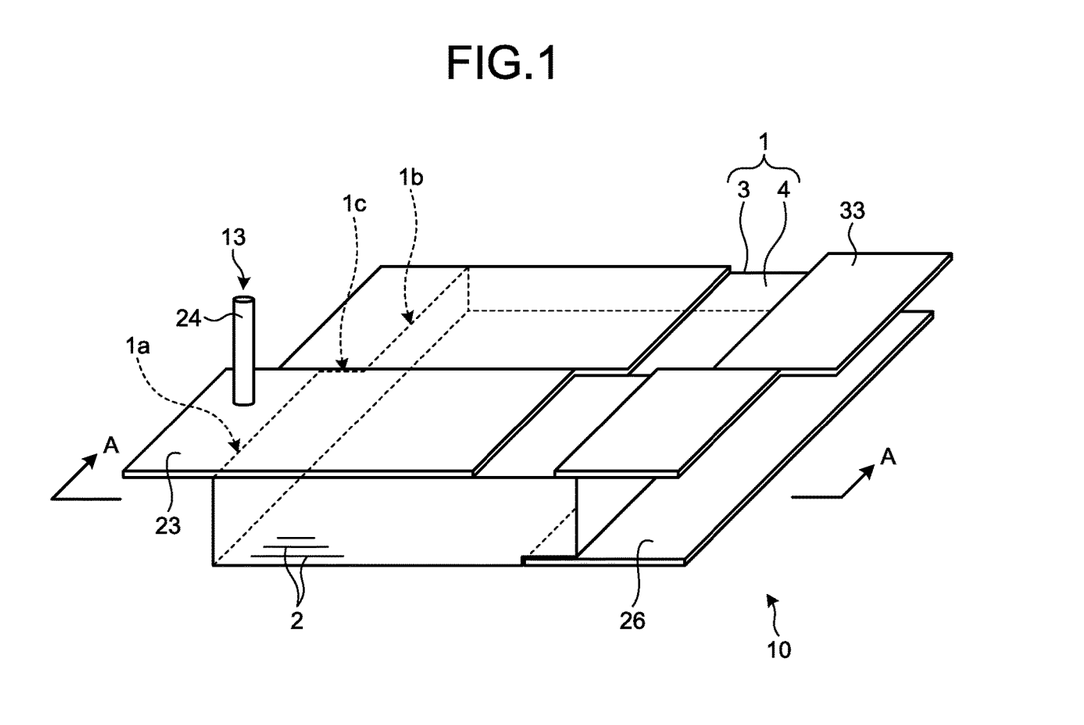
FIG. 1 is a schematic configuration diagram illustrating a part of a molding device for a composite material according to a first embodiment.
Figure 2:
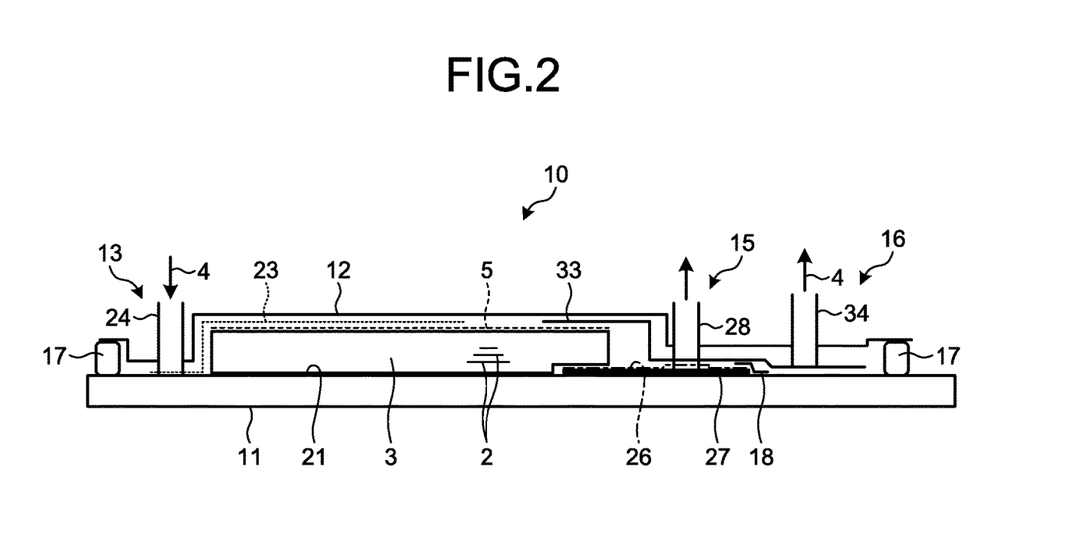
FIG. 2 is a sectional view schematically illustrating the molding device for a composite material according to the first embodiment.
Figure 3:
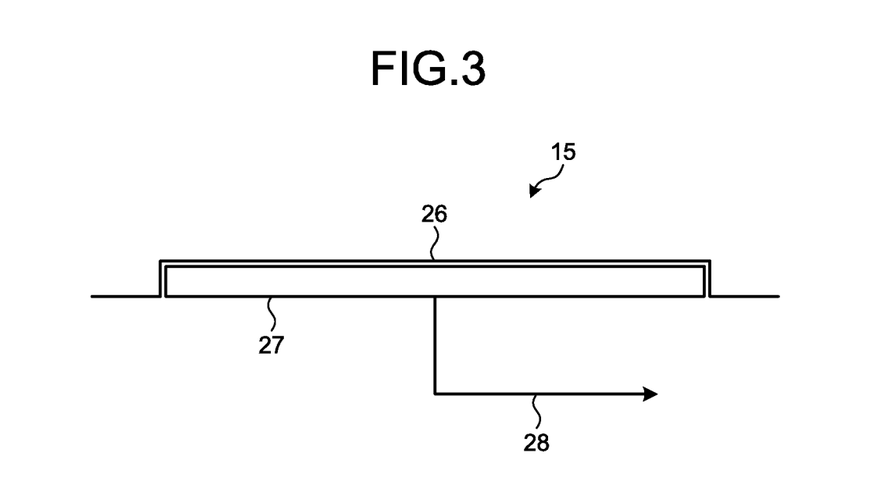
FIG. 3 is a schematic diagram illustrating an example of a degassing waterproof unit.
Figure 4:
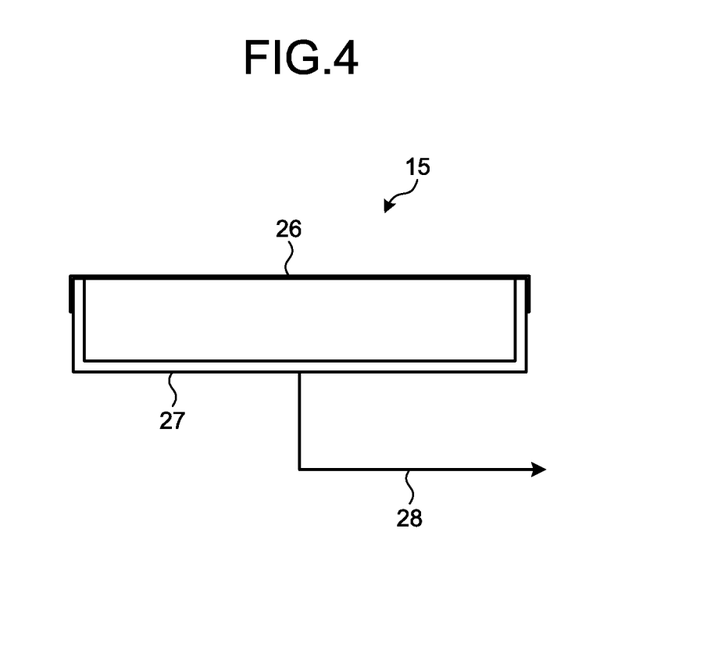
FIG. 4 is a schematic diagram illustrating an el ample of the degassing waterproof unit.
Figure 5:
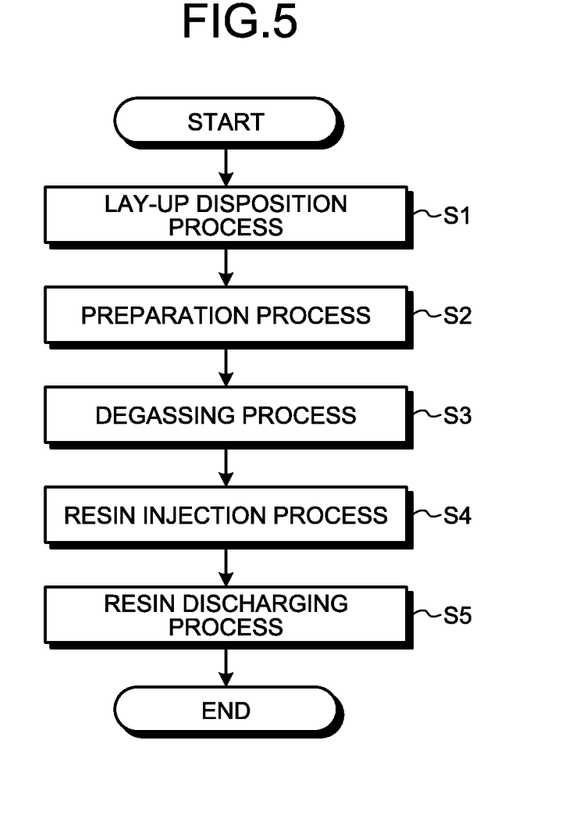
FIG. 5 is a flowchart relating to a molding method for a composite material according to the first embodiment.

FIG. 1 is a schematic configuration diagram illustrating a part of a molding device for a composite material according to a first embodiment. FIG. 2 is a sectional view schematically illustrating the molding device for a composite material according to the first embodiment, and is a sectional view cut along a line A-A in FIG. 1. FIG. 3 is a schematic diagram illustrating an example of a degassing waterproof unit. FIG. 4 is a schematic diagram illustrating an example of the degassing waterproof unit. FIG. 5 is a flowchart relating to a molding method for a composite material according to the first embodiment.

For example, the composite material 1 molded in the first embodiment is configured by carbon fiber reinforced plastic (CFRP). The composite material 1 is molded by what is called a Vacuum assisted Resin Transfer Molding (VaRTM) process. In the VaRTM process, the composite material 1 is molded by first molding a lay-up 3 by laying up a sheet-like fiber-reinforced base material 2, and by curing the lay-up 3 by impregnating the lay-up 3 with resin 4.

Figure 8:
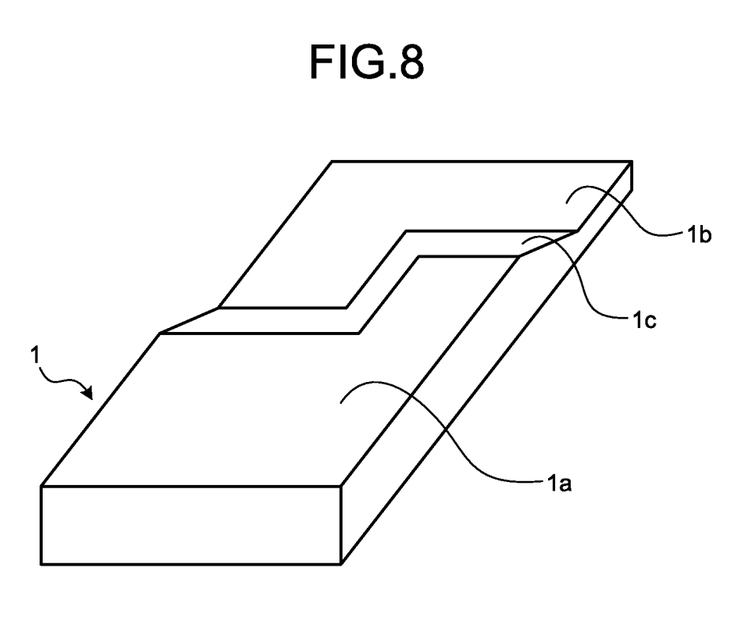
FIG. 8 is a perspective view schematically illustrating an example of a composite material.

As illustrated in FIG. 1, the plate thickness of the composite material 1 in the laying-up direction is changed along a predetermined in-plane direction (one direction) in a plane perpendicular to the laying-up direction of the fiber-reinforced base material 2. More particularly, in one direction, the composite material 1 is molded including a thick part 1a that is a portion in which the plate thickness is thick, a thin part 1b that is a portion in which the plate thickness is thin, and a step part 1c that is a portion in which the plate thickness between the thick part 1a and the thin part 1b is changed. In the first embodiment, the longitudinal direction toward which the composite material 1 is extended is referred to as one direction, and a direction perpendicular to the longitudinal direction and the laying-up direction is referred to as a width direction (perpendicular direction). However, it is not particularly limited, and the width direction may also be referred to as the one direction, and the longitudinal direction may also be referred to as the perpendicular direction. Moreover, the plate thickness may be changed at least along one direction. For example, as the composite material 1 illustrated in FIG. 8, in the plane, the plate thickness may be changed along the other direction perpendicular to the one direction. FIG. 8 is a perspective view schematically illustrating an example of a composite material. As illustrated in FIG. 8, the plate thickness of the composite material 1 is changed along the longitudinal direction and the width direction. In other words, the thick part 1a is formed in an L-shape in a plan view, by a portion formed closer to one side in the longitudinal direction (lower side in FIG. 8), and a portion formed closer to the other side in the width direction (right side in FIG. 8). Moreover, the thin part 1b is formed in an L-shape in a plan view, by a portion formed closer to the other side in the longitudinal direction (upper side in FIG. 8), and a portion formed closer to one side in the width direction (left side in FIG. 8). The thin part 1b and the thick part 1a are formed in a complementary manner. The step part 1c is formed between the thick part 1a and the thin part 1b, and includes a portion in which the plate thickness is changed in the longitudinal direction, and a portion in which the plate thickness is changed in the width direction. In the following, the composite material 1 illustrated in FIG. 1 is used for explanation.

As illustrated in FIG. 1 and FIG. 2, a molding device 10 that molds the composite material 1 described above includes a molding jig 11, a bagging film (film) 12, a resin supplying unit 13, a degassing waterproof unit 15, and a resin discharging unit 16.

A molding surface 21 for molding the composite material 1 is provided on the top surface of the molding jig 11. The molding surface 21 is a surface for forming the upper surface of the composite material 1 to be a product, and forms the upper surface of the composite material 1 in a highly accurate manner. The lay-up 3 is disposed on the molding surface 21 of the molding jig 11, by laying up the fiber-reinforced base material 2 thereon. The fiber-reinforced base material 2 is laid up such that the plate thickness of the lay-up 3 in the laying-up direction is changed along the longitudinal direction.

When the fiber-reinforced base material 2 is laid up, a peel ply 5 that is peeled off to activate the upper surface of the lay-up 3 may also be disposed on the upper layer of the lay-up 3 at the top surface side.

The bagging film 12 covers the lay-up 3 disposed on the molding surface 21 of the molding jig 11. Moreover, the inside of the bagging film 12 is hermetically sealed, by providing a seal material 17 between the molding jig 11 and the bagging film 12.

The resin supplying unit 13 supplies the resin 4 to the lay-up 3. The resin supplying unit 13 is provided at the bagging film 12 side of the lay-up 3, and is provided at one side (left side in FIG. 1 and FIG. 2) of the lay-up 3 in the width direction. The resin supplying unit 13 includes a resin diffusion medium 23 and a resin supplying line 24.

The resin diffusion medium 23 is provided inside the bagging film 12, and is disposed on the top surface of the lay-up 3. Moreover, the resin diffusion medium 23 is not extended to the end part at the other side of the lay-up 3, and is provided closer to one side of the lay-up 3 in the width direction. The resin diffusion medium 23 is also disposed along the longitudinal direction of the lay-up 3. For example, a mesh, a non-woven fabric, and the like are used for the resin diffusion medium 23.

An end of the resin supplying line 24 is connected to the resin diffusion medium 23, and the resin supplying line 24 is provided across the interior and exterior of the bagging film 12. The resin supplying line 24 supplies the resin 4 from the outside of the bagging film 12 toward the resin diffusion medium 23 in the bagging film 12. An opening and closing valve, which is not illustrated, is provided on the resin supplying line 24. The resin supplying line 24 supplies resin by opening the opening and closing valve, and stops supplying resin by closing the opening and closing valve.

In the resin supplying unit 13 described above, when the resin 4 is supplied from the resin supplying line 24 toward the resin diffusion medium 23, the resin diffusion medium 23 supplies the resin 4 from one side on the top surface of the lay-up 3 in the width direction, while diffusing the resin 4 in the longitudinal direction of the lay-up 3. In this manner, the resin supplying unit 13 functions as a resin diffusion and supplying unit that diffuses and supplies the resin 4 in the longitudinal direction of the lay-up 3. Because the resin diffusion medium 23 is not extended to the end part at the other side of the lay-up 3, the resin diffusion medium 23 can prevent resin from moving faster toward the other side (suction side) of the lay-up 3.

The degassing waterproof unit 15 sucks the atmosphere in the bagging film 12, while blocking the resin 4 from flowing in. The degassing waterproof unit 15 is provided between the lay-up 3 and the molding jig 11, in other words, at the lower surface (molding surface 21) side of the lay-up 3, and at the other side (right side in FIG. 1 and FIG. 2) of the lay-up 3 in the width direction. In this example, the other side of the lay-up 3 in the width direction is an unused area that is an area where the composite material 1 after being molded is not used as a product. The degassing waterproof unit 15 is provided on the unused area. For example, the unused area is an area to be cut during machining and the like. The degassing waterproof unit 15 includes a breathable waterproof membrane 26, a vacuum suction medium 27, and a vacuum suction line 28. FIG. 3 and FIG. 4 each illustrate an example of the degassing waterproof unit 15.

The breathable waterproof membrane 26 is semi-permeable. While allowing the atmosphere in the bagging film 12 to pass through, the breathable waterproof membrane 26 blocks the resin 4 in the bagging film 12 from passing through. For example, Gore-Tex (registered trademark) and the like is used for the breathable waterproof membrane 26. The breathable waterproof membrane 26 is provided in the bagging film 12, and is provided at the most upstream side of the flowing direction of the atmosphere in the bagging film 12.

The vacuum suction medium 27 is provided in the bagging film 12, and is provided at the downstream side of the breathable waterproof membrane 26 in the flowing direction of the atmosphere. In other words, the vacuum suction medium 27 is provided between the breathable waterproof membrane 26 and the molding jig 11. For example, a mesh, a non-woven fabric, a groove, a duct, and the like are applied as the vacuum suction medium 27.

In FIG. 3, a sheet-like member such as a mesh or a non-woven fabric is applied as the vacuum suction medium 27. When the vacuum suction medium 27 is a sheet-like member, the degassing waterproof unit 15 illustrated in FIG. 3 is provided such that the breathable waterproof membrane 26 covers the vacuum suction medium 27.

Moreover, in FIG. 4, a duct is applied as the vacuum suction medium 27. When the vacuum suction medium 27 is a duct, the degassing waterproof unit 15 illustrated in FIG. 4 is provided such that the breathable waterproof membrane 26 covers the opening part of the vacuum suction medium 27.

The breathable waterproof membrane 26 and the vacuum suction medium 27 described above are provided closer to the other side of the lay-up 3 in the width direction, and are disposed along the longitudinal direction of the lay-up 3. A seal tape 18 for preventing the leakage of atmosphere from a boundary may also be applied on the boundary between the edge part of the breathable waterproof membrane 26 and the molding jig 11.

An end of the vacuum suction line 28 is connected to the vacuum suction medium 27, and the vacuum suction line 28 is provided across the interior and exterior of the bagging film 12. The vacuum suction line 28 sucks the atmosphere in the bagging film 12 via the vacuum suction medium 27. In the first embodiment, the vacuum suction line 28 is provided across the interior and exterior of the bagging film 12. However, the vacuum suction line 28 may also be provided inside the molding jig 11, and the layout of the vacuum suction line 28 is not particularly limited. An opening and closing valve, which is not illustrated, is provided on the vacuum suction line 28. The vacuum suction line 28 sucks the atmosphere by opening the opening and closing valve, and stops sucking the atmosphere by closing the opening and closing valve.

In the degassing waterproof unit 15 described above, when the atmosphere in the bagging film 12 is sucked from the vacuum suction line 28 via the vacuum suction medium 27, the vacuum suction medium 27 degasses the inside of the bagging film 12, by sucking the atmosphere from the other side of the lay-up 3 in the width direction, along the longitudinal direction. On the other hand, because the breathable waterproof membrane 26 blocks the resin 4 from flowing in, the degassing waterproof unit 15 prevents the resin 4 from flowing into the vacuum suction medium 27 and the vacuum suction line 28. Moreover, in the degassing waterproof unit 15, when the breathable waterproof membrane 26 is covered by the resin 4, the flow of atmosphere is blocked. Consequently, when the breathable waterproof membrane 26 is covered by the resin 4, the degassing waterproof unit 15 also stops sucking the atmosphere.

The resin discharging unit 16 discharges the resin 4 supplied to the lay-up 3. The resin discharging unit 16 is provided at the bagging film 12 side of the lay-up 3, and is provided at the other side of the lay-up 3 in the width direction (right side in FIG. 1 and FIG. 2). Consequently, in the width direction, the resin discharging unit 16 is provided at the same side of the degassing waterproof unit 15, and in the laying-up direction, the resin discharging unit 16 is provided at a position that faces the degassing waterproof unit 15 with the lay-up 3 interposed therebetween. The resin discharging unit 16 includes a resin discharging medium 33 and a resin discharging line 34.

The resin discharging medium 33 is provided inside the bagging film 12, and is disposed on the top surface of the lay-up 3. Moreover, the resin discharging medium 33 is provided closer to the other side of the lay-up 3 in the width direction, and is disposed along the longitudinal direction of the lay-up 3. For example, a mesh, a non-woven fabric, and the like are used for the resin discharging medium 33.

An end of the resin discharging line 34 is connected to the resin discharging medium 33, and the resin discharging line 34 is provided across the interior and exterior of the bagging film 12. The resin discharging line 34 discharges the resin 4 in the bagging film 12 via the resin discharging medium 33. An opening and closing valve, which is not illustrated, is provided on the resin discharging line 34. The resin discharging line 34 discharges resin by opening the opening and closing valve, and stops discharging resin by closing the opening and closing valve.

In the resin discharging unit 16 described above, when the resin 4 is discharged from the resin discharging line 34 via the resin discharging medium 33, the resin discharging medium 33 discharges the resin 4 along the longitudinal direction of the lay-up 3, and discharges the resin 4 from the other side on the top surface of the lay-up 3 in the width direction.

Next, with reference to FIG. 5, a molding method for the composite material 1 using the molding device 10 described above will be explained. The breathable waterproof membrane 26 and the vacuum suction medium 27 of the degassing waterproof unit 15 are disposed in advance on the molding jig 11 of the molding device 10. First, in this molding method, the lay-up 3 is disposed on the molding surface 21 of the molding jig 11, by laying up the fiber-reinforced base material 2 (step S1: lay-up disposition process). At the lay-up disposition process S1, the fiber-reinforced base material 2 is laid up so that the plate thickness of the lay-up 3 is changed along the longitudinal direction. In this example, at the lay-up disposition process S1, the lay-up 3 is disposed so that the degassing waterproof unit 15 is placed between the other side of the lay-up 3 in the width direction and the molding jig 11.

Next, the lay-up 3 disposed on the molding jig 11 is covered by the bagging film 12, and the seal material 17, the resin supplying unit 13, and the resin discharging unit 16 are disposed (step S2: preparation process). At the preparation process S2, the lay-up 3 is covered by the bagging film 12, and the bagging film 12 is hermetically sealed by disposing the seal material 17 between the bagging film 12 and the molding jig 11, at the outside of the bagging film 12. Moreover, at the preparation process S2, the resin supplying unit 13 is disposed at one side on the top surface of the lay-up 3 in the width direction, and the resin discharging unit 16 is disposed at the other side on the top surface of the lay-up 3 in the width direction.

After performing the preparation process S2, the lay-up 3 is degassed by sucking the atmosphere in the bagging film 12 that is hermetically sealed by the degassing waterproof unit 15 (step S3: degassing process). More specifically, at the degassing process S3, the degasification of the lay-up 3 is performed by closing the opening and closing valves provided on the resin supplying line 24 and the resin discharging line 34, and opening the opening and closing valve provided on the vacuum suction line 28.

After performing the degassing process S3, the resin 4 is supplied from the resin supplying unit 13 toward the lay-up 3, and while blocking the resin 4 in the bagging film 12 from passing from the degassing waterproof unit 15, the atmosphere in the bagging film 12 is sucked, and the lay-up 3 is impregnated with the resin 4 (step S4: resin injection process). More specifically, at the resin injection process S4, the resin 4 is supplied to the lay-up 3, by closing the opening and closing valve provided on the resin discharging line 34, and opening the opening and closing valves provided on the resin supplying line 24 and the vacuum suction line 28.

At the resin injection process S4, when the resin 4 is injected into the lay-up 3, on the top surface of the lay-up 3, the resin 4 is impregnated in the in-plane direction and the laying-up direction. In this process, the impregnation rate of the resin 4 in the laying-up direction is slower than that of the resin 4 in the in-plane direction. Consequently, the resin 4 spreads easily in the in-plane direction, but does not impregnate easily in the laying-up direction. Moreover, the thin part 1b of the lay-up 3 is impregnated with the resin 4 that impregnates in the laying-up direction faster than that of the thick part 1a. Thus, the resin 4 reaches the molding surface 21 of the thin part 1b first, and then reaches the molding surface 21 of the thick part 1a. Hence, the resin 4 that has reached the molding surface 21 covers the breathable waterproof membrane 26 of the degassing waterproof unit 15, from the thin part 1b side toward the thick part 1a side, in the longitudinal direction of the lay-up 3. When the resin 4 covers the entire surface of the breathable waterproof membrane 26 of the degassing waterproof unit 15, the suction of atmosphere in the bagging film 12 will be stopped.

After performing the resin injection process S4, the injection amount of the resin 4 into the lay-up 3 is adjusted, by discharging the resin 4 in the bagging film 12 by the resin discharging unit 16 (step S5: resin discharging process). More particularly, at the resin discharging process S5, the resin 4 is discharged from the lay-up 3, by opening the opening and closing valves provided on the resin discharging line 34 and the vacuum suction line 28, and closing the opening and closing valve provided on the resin supplying line 24. It is to be noted that even when the opening and closing valve provided on the vacuum suction line 28 is opened, as described above, the entire surface of the breathable waterproof membrane 26 of the degassing waterproof unit 15 is covered by the resin 4. Consequently, the suction of atmosphere in the bagging film 12 will not be performed. It is also to be noted that at the resin discharging process S5, the opening and closing valve provided on the vacuum suction line 28 may be closed. Moreover, after performing the resin discharging process S5, the lay-up 3 impregnated with the resin 4 proceeds to a heat curing process.

In this manner, with the first embodiment, it is possible to supply the resin 4 from the bagging film 12 side of the lay-up 3, and suck the atmosphere in the bagging film 12 from the molding surface 21 side of the lay-up 3. In this process, the atmosphere in the bagging film 12 is sucked from the bagging film 12 side toward the molding surface 21 side. Consequently, with this suction, the resin 4 is also impregnated in a suitable manner in the laying-up direction toward which the impregnation rate is slow. Moreover, because the degassing waterproof unit 15 is provided along one direction of the lay-up 3, in the composite material 1 in which the plate thickness is changed along one direction, the suction of atmosphere can be continued at the other part of the degassing waterproof unit 15 corresponding to the thick part 1a, even if the impregnation of the thin part 1b is finished, and the suction is finished after the resin 4 has reached a part of the degassing waterproof unit 15 corresponding to the thin part 1b. Thus, the suction of atmosphere can be continued until the resin 4 has reached the entire area of the degassing waterproof unit 15. Hence, it is possible to perform degasification at the molding surface 21 side in a suitable manner, in the thin part 1b in which the plate thickness is thin and in the thick part 1a in which the plate thickness is thick. Consequently, in the lay-up 3, it is possible to prevent a non-impregnated area of the resin 4 from being formed, and form the composite material 1 by impregnating the lay-up 3 with the resin 4 in a suitable manner.

Furthermore, with the first embodiment, after the lay-up 3 is impregnated with the resin 4, it is possible to discharge the resin 4 in the bagging film 12 by the resin discharging unit 16 provided at the bagging film 12 side of the lay-up 3. Consequently, it is possible to adjust the injection amount of the resin 4 so that the plate thickness or the fiber content required for the composite material 1 is obtained.

Still furthermore, with the first embodiment, the resin supplying unit 13 can diffuse and supply the resin 4 in the longitudinal direction of the lay-up 3. Thus, it is possible to supply the resin 4 along the longitudinal direction toward which the plate thickness is changed. Consequently, by diffusing the resin 4 from the bagging film 12 side of the lay-up 3, it is possible to prevent a non-impregnated area from being formed due to a change in the plate thickness.

Still furthermore, with the first embodiment, in the degassing waterproof unit 15, it is possible to suck the atmosphere in the bagging film 12 from the vacuum suction line 28 via the vacuum suction medium 27 and the breathable waterproof membrane 26.

Still furthermore, with the first embodiment, the degassing waterproof unit 15 is provided at the molding surface 21 side of the lay-up 3. Consequently, by providing the degassing waterproof unit 15 on the unused area, it is possible to prevent the molding surface 21 of a product from being defectively formed.

Still furthermore, with the first embodiment, the degassing waterproof unit 15 can suck the atmosphere in the bagging film 12 from the other side of the lay-up 3 in the width direction, while the resin supplying unit 13 supplies the resin 4 from one side of the lay-up 3 in the width direction. Consequently, it is possible to impregnate the lay-up 3 with the resin 4 in a suitable manner.

Still furthermore, with the first embodiment, the resin diffusion medium 23 is not extended to the end part at the other side of the lay-up 3. Consequently, at the other side of the lay-up 3 in the width direction, it is possible to prevent the resin 4 from moving faster toward the molding surface 21 side from the bagging film 12 side. Thus, it is possible to impregnate the lay-up 3 with the resin 4 in a suitable manner.

In the first embodiment, the resin supplying unit 13 and the resin discharging unit 16 are provided as independent systems. However, the resin supplying unit 13 and the resin discharging unit 16 may serve as one unit. With this configuration, by serving the resin supplying unit 13 as the resin discharging unit 16, it is possible to simplify the device structure and prevent an increase in the device cost.

Second Embodiment

Figure 6:
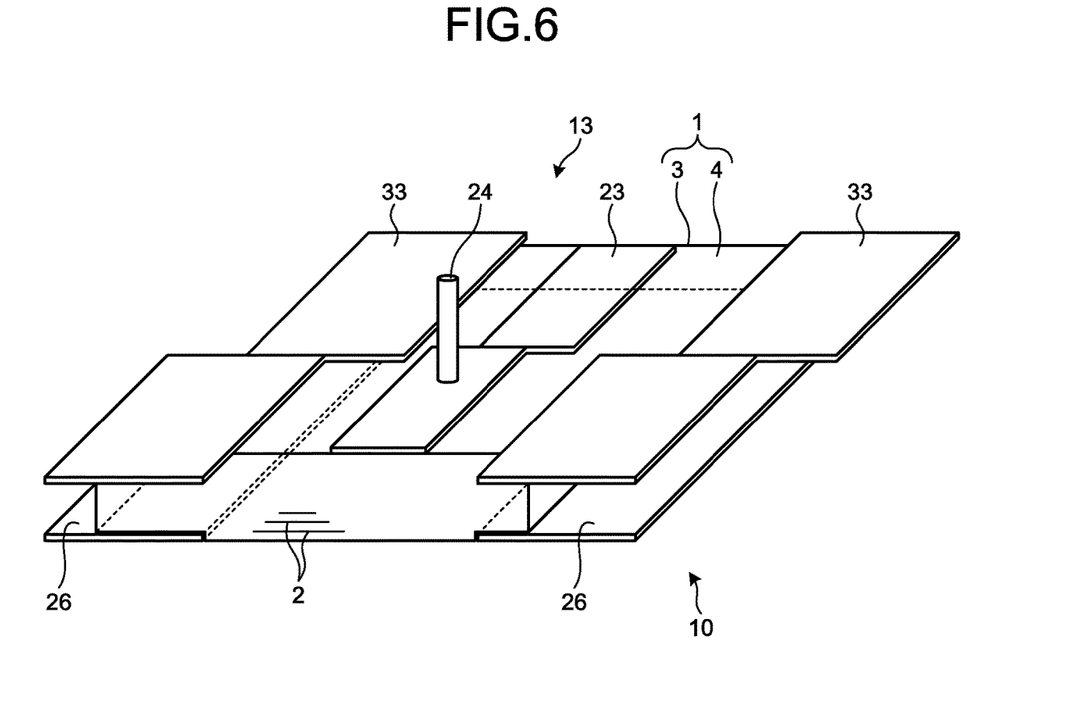
FIG. 6 is a schematic configuration diagram illustrating a part of a molding device for a composite material according to a second embodiment.

Next, with reference to FIG. 6, the molding device 10 of the composite material 1 according to a second embodiment will be described. In the second embodiment, to prevent repetition, only the portions different from those in the first embodiment will be described. The same reference numerals denote the same portions as those in the first embodiment. FIG. 6 is a schematic configuration diagram illustrating a part or a molding device for a composite material according to the second embodiment.

In the molding device 10 according to the second embodiment, the layout of the resin supplying unit 13 and the degassing waterproof unit 15 in the first embodiment is changed. More particularly, in the molding device 10 of the second embodiment, the resin supplying unit 13 is provided at the bagging film 12 side of the lay-up 3, and is provided at the center of the lay-up 3 in the width direction. Consequently, when the resin supplying unit 13 supplies the resin 4 from the resin supplying line 24 toward the resin diffusion medium 23, the resin diffusion medium 23 supplies the resin 4 from the center on the top surface of the lay-up 3 in the width direction, while diffusing the resin 4 in the longitudinal direction of the lay-up 3.

In the molding device 10 of the second embodiment, the degassing waterproof unit 15 is provided between the lay-up 3 and the molding jig 11, in other words, at the lower surface (molding surface 21) side of the lay-up 3. A pair of the degassing waterproof units 15 are also provided at both sides of the lay-up 3 in the width direction. Consequently, when the degassing waterproof unit 15 sucks the atmosphere in the bagging film 12 from the vacuum suction line 28 via the vacuum suction medium 27, the vacuum suction medium 27 degasses the inside of the bagging film 12, by sucking the atmosphere from both sides of the lay-up 3 in the width direction along the longitudinal direction.

In this manner, with the second embodiment, the degassing waterproof unit 15 can suck the atmosphere in the bagging film 12 from both sides of the lay-up 3 in the width direction, while the resin supplying unit 13 supplies the resin 4 from the center of the lay-up 3 in the width direction. Consequently, it is possible to impregnate the lay-up 3 with the resin 4 in a suitable manner.

Third Embodiment

Figure 7:
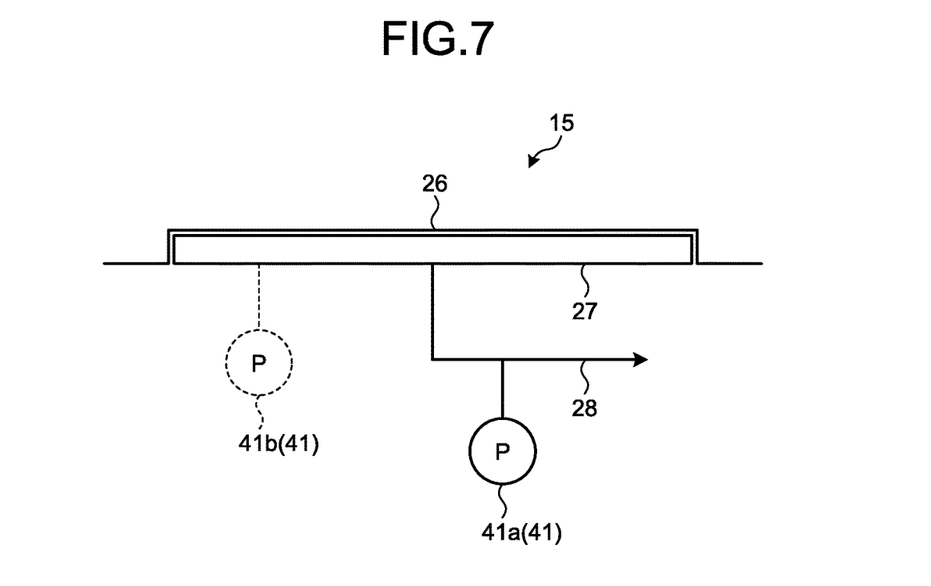
FIG. 7 is a schematic diagram illustrating an example of a degassing waterproof unit in a molding device for a composite material according to a third embodiment.

Next, with reference to FIG. 7, the molding device 10 of the composite material 1 according to a third embodiment will be described. In the third embodiment also, to prevent repetition, only the portions different from those in the first embodiment and the second embodiment will be described. The same reference numerals denote the same portions as those in the first embodiment and the second embodiment. FIG. 7 is a schematic diagram illustrating an example of a degassing waterproof unit in a molding device for a composite material according to the third embodiment.

In the molding device 10 according to the third embodiment, a vacuum gauge 41 is disposed on the degassing waterproof unit 15 of the first embodiment. In the third embodiment, the vacuum gauge 41 is applied to the degassing waterproof unit 15 illustrated in FIG. 3 in the first embodiment. However, the vacuum gauge 41 may also be applied to the degassing waterproof unit 15 illustrated in FIG. 4 in the first embodiment, and is not particularly limited. More particularly, in the molding device 10 of the third embodiment, for example, the vacuum gauge 41 is a vacuum gauge 41a (solid line) provided on the vacuum suction line 28 of the degassing waterproof unit 15, and measures the degree of vacuum in the vacuum suction line 28. Moreover, for example, the vacuum gauge 41 may also be a vacuum gauge 41b (dotted line) provided on the vacuum suction medium 27 of the degassing waterproof unit 15, and measures the degree of vacuum in the vacuum suction medium 27. When the vacuum gauge 41b is provided on the vacuum suction medium 27, it is preferable to provide the vacuum gauge 41b at a position of the vacuum suction medium 27 corresponding to a portion where impregnation of the lay-up 3 with the resin 4 is the slowest (for example, the thick part 1a).

In this manner, with the third embodiment, the breathable waterproof membrane 26 can prevent the resin 4 from flowing in. Consequently, it is possible to measure the degree of vacuum in the bagging film 12 by the vacuum gauge 41.

The layout of the resin supplying unit 13 and the degassing waterproof unit 15 illustrated in FIG. 1 and FIG. 6 is not particularly limited, as long as the degassing waterproof unit 15 is disposed at the molding surface 21 side and along the longitudinal direction of the lay-up 3, and the lay-up 3 can be impregnated with the resin 4 in a suitable manner. Thus, for example, the resin supplying unit 13 may be provided at the bagging film 12 side of the lay-up 3, and at both sides of the lay-up 3 in the width direction. Moreover, the degassing waterproof unit 15 may be provided at the molding surface 21 side of the lay-up 3, and at the center of the lay-up 3 in the width direction.

REFERENCE SIGNS LIST

1 Composite material
1a Thick part
1b Thin part
1c Step part
2 Fiber-reinforced base material
3 Lay-up
4 Resin
5 Peel ply
10 Molding device
11 Molding jig
12 Bagging film
13 Resin supplying unit
15 Degassing waterproof unit
16 Resin discharging unit
17 Seal material
18 Seal tape 21 Molding surface
23 Resin diffusion medium
24 Resin supplying line
26 Breathable waterproof membrane
27 Vacuum suction medium
28 Vacuum suction line
33 Resin discharging medium
34 Resin discharging line
41 Vacuum gauge
41a Vacuum gauge
41b Vacuum gauge

The invention claimed is:

1. A molding method for a composite material to mold the composite material obtained by laying up a fiber-reinforced base material, the molding method comprising:
   disposing, along a longitudinal direction, a lay-up in which the fiber-reinforced base material is laid up, on a molding surface of a molding jig for molding the composite material, the longitudinal direction being a direction in which the composite material extends, the longitudinal direction existing in a plane perpendicular to a laying-up direction of the lay-up;
   covering the lay-up with a film to hermetically seal the lay-up;
   supplying resin toward the lay-up from a resin supplying unit provided at a film side of the lay-up relative to the laying-up direction of the lay-up;
   sucking atmosphere from between the film and the molding surface by a degassing waterproof unit, while blocking the resin from being sucked out by the degassing waterproof unit, in order to impregnate the lay-up with the resin, the degassing waterproof unit being provided at a molding surface side of the lay-up relative to the laying-up direction, and provided along the longitudinal direction; and
   stopping the supplying of the resin by the resin supplying unit and discharging the resin between the film and the lay-up or between the molding jig and the lay-up by a resin discharging unit after an entire surface of the degassing waterproof unit is covered with the resin and the lay-up is impregnated with the resin, the resin discharging unit and the resin supplying unit being provided on opposite sides of the lay-up with respect to a width direction or with respect to the laying-up direction,
   wherein the resin supplying unit includes a resin diffusion medium provided between the film and the lay-up or between the molding jig and the lay-up,
   the resin diffusion medium only partially extends along a width of the lay-up such that a gap exists between the resin diffusion medium and the degassing waterproof unit on the plane perpendicular to the laying-up direction,
   a plate thickness of the lay-up in the laying-up direction is changed from a first thickness to a second thickness along the longitudinal direction so as to form a step part therebetween on an area to be used as a product, the second thickness being greater than the first thickness, and
   the degassing waterproof unit is provided along an entire length of the step part in the longitudinal direction such that during impregnation, the resin covers the degassing waterproof unit from a point along the longitudinal direction at which the plate thickness of the lay-up is the first thickness to a point along the longitudinal direction at which the plate thickness of the lay-up is the second thickness.

2. A molding device for a composite material to mold the composite material obtained by laying up a fiber-reinforced base material, the molding device comprising:
   a molding jig on which a lay-up in which the fiber-reinforced base material is laid up is disposed along a longitudinal direction, the molding jig having a molding surface for molding the composite material, the longitudinal direction being a direction in which the composite material extends, the longitudinal direction existing in a plane perpendicular to a laying-up direction of the lay-up;
   a film for covering the lay-up to hermetically seal the lay-up;
   a resin supplying unit provided at a film side of the lay-up, relative to the laying-up direction of the lay-up, to supply resin;
   a degassing waterproof unit provided at a molding surface side of the lay-up relative to the laying-up direction and provided along the longitudinal direction to suck atmosphere from between the film and the molding surface, while blocking the resin from being sucked out by the degassing waterproof unit; and
   a resin discharging unit configured to, upon stopping the supply of resin from the resin supplying unit, discharge the resin between the film and the lay-up or between the molding jig and the lay-up after an entire surface of the degassing waterproof unit is covered with the resin, the resin discharging unit and the resin supplying unit being provided on opposite sides of the lay-up with respect to a width direction or with respect to the laying-up direction,
   wherein the resin supplying unit includes a resin diffusion medium provided between the film and the lay-up or between the molding jig and the lay-up,
   the resin diffusion medium only partially extends along a width of the lay-up such that a gap exists between the resin diffusion medium and the degassing waterproof unit on the plane perpendicular to the laying-up direction,
   a plate thickness of the lay-up in the laying-up direction is changed from a first thickness to a second thickness along the longitudinal direction so as to form a step part therebetween on an area to be used as a product, the second thickness being greater than the first thickness, and
   the degassing waterproof unit is provided along an entire length of the step part in the longitudinal direction such that during impregnation, the resin covers the degassing waterproof unit from a point along the longitudinal direction at which the plate thickness of the lay-up is the first thickness to a point along the longitudinal direction at which the plate thickness of the lay-up is the second thickness.

3. The molding device for a composite material according to claim 2, wherein the resin supplying unit is a resin diffusion and supplying unit that diffuses the resin in the longitudinal direction of the lay-up to supply the resin.

4. The molding device for a composite material according to claim 2, wherein
   the degassing waterproof unit includes
      a breathable waterproof membrane that allows the atmosphere between the film and the molding surface to pass through and that blocks the resin between the film and the lay-up or between the molding jig and the lay-up from being sucked out by the degassing waterproof unit, a vacuum suction medium through which the atmosphere that has passed through the breathable waterproof membrane flows, the vacuum suction medium being provided at a downstream side of a flowing direction of the atmosphere, and a vacuum suction line connected to the vacuum suction medium.

5. The molding device for a composite material according to claim 4, wherein the degassing waterproof unit further includes a vacuum gauge provided on one of the vacuum suction medium and the vacuum suction line to measure a degree of vacuum.

6. A molding device for a composite material to mold the composite material obtained by laying up a fiber-reinforced base material, the molding device comprising:

a molding jig on which a lay-up in which the fiber-reinforced base material is laid up is disposed, the molding jig having a molding surface for molding the composite material;

a film for covering the lay-up to hermetically seal the lay-up;

a resin supplying unit provided at a film side of the lay-up, relative to a laying-up direction of the lay-up, to supply resin;

a degassing waterproof unit provided at a molding surface side of the lay-up relative to the laying-up direction and provided along one direction in a plane perpendicular to the laying-up direction to suck atmosphere from between the film and the molding surface, while blocking the resin from being sucked out by the degassing waterproof unit; and a resin discharging unit provided at the film side of the lay-up to discharge the resin between the film and the lay-up or between the molding jig and the lay-up, wherein a plate thickness of the lay-up in the laying-up direction is changed along the one direction in the plane perpendicular to the laying-up direction so as to form a step part on an area to be used as a product, and wherein the resin discharging unit serves as the resin supplying unit.

7. The molding device for a composite material according to claim 2, wherein the degassing waterproof unit is provided on an unused area that is an area where the composite material after being molded is not used as a product.

8. The molding device for a composite material according to claim 2, wherein the width direction is a direction perpendicular to the longitudinal direction in the plane of the lay-up.

9. The molding device for a composite material according to claim 2, wherein the resin supplying unit is provided at a center in a perpendicular direction, where the perpendicular direction is a direction perpendicular to the longitudinal direction, in the plane of the lay-up, and the degassing waterproof unit is provided at both sides in the perpendicular direction.

* * * * *